United States Patent
Fukuyama et al.

[11] Patent Number: 6,121,704
[45] Date of Patent: Sep. 19, 2000

[54] MAGNETIC BEARING

[75] Inventors: Hiromasa Fukuyama; Takeshi Takizawa, both of Kanagawa, Japan

[73] Assignee: NSK Ltd., Tokyo, Japan

[21] Appl. No.: 09/124,760

[22] Filed: Jul. 29, 1998

[30] Foreign Application Priority Data

Jul. 30, 1997 [JP] Japan ................................. 9-218298
Oct. 24, 1997 [JP] Japan ................................. 9-309576

[51] Int. Cl.[7] .................................................... F16C 32/04
[52] U.S. Cl. ........................................................ 310/90.5
[58] Field of Search .................................. 310/90.5, 154, 310/258; 318/635

[56] References Cited

U.S. PATENT DOCUMENTS

| | | | |
|---|---|---|---|
| 3,888,553 | 6/1975 | Wehde | 310/90.5 |
| 4,180,296 | 12/1979 | Habermann | 308/10 |
| 4,483,570 | 11/1984 | Inoue | 308/10 |
| 4,983,870 | 1/1991 | McSparran | 310/90.5 |
| 5,003,211 | 3/1991 | Groom | 310/90.5 |
| 5,046,151 | 9/1991 | Yamamura | 310/90.5 |
| 5,216,308 | 6/1993 | Meeks | 310/90.5 |
| 5,250,865 | 10/1993 | Meeks | 310/90.5 |
| 5,302,874 | 4/1994 | Pinkerton | 310/90.5 |
| 5,315,197 | 5/1994 | Meeks et al. | 310/90.5 |
| 5,365,137 | 11/1994 | Richardson et al. | 310/258 |
| 5,462,470 | 10/1995 | Oda et al. | 310/90.5 |
| 5,514,924 | 5/1996 | McMullen et al. | 310/90.5 |
| 5,731,645 | 3/1998 | Clifton et al. | 310/74 |

FOREIGN PATENT DOCUMENTS

| | | | |
|---|---|---|---|
| 2451972 | 5/1976 | Germany | F16C 32/04 |
| 56-150618 | 11/1981 | Japan | F16C 32/04 |
| 3-43467 | 9/1991 | Japan | F16C 32/00 |
| 4-171316 | 6/1992 | Japan | . |
| 5-196038 | 8/1993 | Japan | F16C 32/04 |
| 630711 | 10/1978 | U.S.S.R. | H02K 5/00 |

*Primary Examiner*—Nestor Ramirez
*Assistant Examiner*—Burton S. Mullins
*Attorney, Agent, or Firm*—Evenson, McKeown, Edwards & Lenahan, PLLC

[57] ABSTRACT

There is disclosed a magnetic bearing which is an improvement over conventional radial magnetic bearings, and has a very small bearing loss. At least three U-shaped laminates 10 of electromagnetic steel sheets are circumferentially arranged around a rotation shaft 1, and are fixedly mounted on a housing 100. Exciting coils 31 and 32 are wound on each electromagnetic steel sheet laminate 10, and permanent magnets 20 and 21 are provided in the laminate 10. Rotor cores 2, each comprising a laminate of I-shaped electromagnetic steel sheets stacked together in the circumferential direction, are mounted on the rotation shaft 1 in such a manner that each rotor core 2 is opposed to magnetic pole surfaces of the electromagnetic steel sheet laminates 10. In accordance with a signal from position sensors 5 which detect the radial position of the rotation shaft 1, control current is caused to flow through the exciting coils 31 and 32 to thereby control the position of the rotation shaft 1. Thus, merely by causing the control current to flow through the exciting coils 31 and 32 when this is required, the control of the rotation shaft 1 can be achieved, and with this method, the energy consumption can be much reduced.

8 Claims, 14 Drawing Sheets

MAGNETIC BEARING

BACKGROUND OF THE INVENTION

1. Field of the Invention

This invention relates to a magnetic bearing which rotatably supports a rotating member, utilizing a magnetic attraction force.

2. Related Art

There is known a magnetic bearing which rotatably supports a rotating member, utilizing a magnetic attraction force. Such a magnetic bearing can support the rotating member in a non-contact condition, and therefore has many advantages such as a small bearing loss, a maintenance-free design, low noises, the obviation of the need for a lubricating oil, and the capability of being used in a vacuum condition.

A conventional magnetic bearing will be described with reference to the drawings. FIG. 1 is a cross-sectional view of a magnetic bearing disclosed in Japanese Patent Unexamined Publication No. 4-171316. In this Figure, the magnetic bearing broadly comprises two members, that is, a shell 101 and a rotation shaft 102. A motor stator 103 is mounted on an inner peripheral surface of the shell 101, and a motor rotor 104 is mounted on an outer peripheral surface of the rotation shaft 102 in opposed relation to the motor stator 103, and with this construction, a rotating force is imparted to the rotation shaft 102.

A pair of electromagnetic attraction stators 105a and 105b are mounted on the inner peripheral surface of the shell 101, and are spaced from each other in an axial direction, and electromagnetic attraction rotors 106a and 106b are mounted on the outer peripheral surface of the rotation shaft 102, and are disposed in opposed relation to the stators 105a and 105b, respectively, and these stators 105a and 105b and these rotors 106a and 106b jointly form a radial bearing, utilizing an electromagnetic attraction force.

A disk-shaped thrust plate 107 is mounted on the outer periphery of the rotation shaft 102, and electromagnetic attraction stators 108 are mounted on the inner peripheral surface of the shell 101 in such a manner that the thrust plate 107 is interposed between those stators 108. The thrust plate 107 and these stators 108 jointly form a thrust bearing, utilizing an electromagnetic attraction force.

Position detection displacement sensors 109a and 109b are mounted on the inner side of the shell 101 for detecting the position of the rotation shaft 102 in a radial direction, and a position detection displacement sensor 110 is mounted on the inner side of the shell 101 for detecting the position of the rotation shaft 102 in a thrust direction. A tool 111 is adapted to be mounted on a distal end portion of the rotation shaft 102.

The rotation shaft 102 is usually made of a ferromagnetic material, and thus, care is taken so that the magnetic efficiency of the motor rotor 104 and the thrust plate 107 will not be lowered. Each of the rotors 104, 106a and 106b comprises silicon steel sheets which are fitted on the rotation shaft 102.

For reasons mentioned below, a large bearing loss develops in the radial magnetic bearing portions of the magnetic bearing of FIG. 1. Namely, the polarity of the electromagnetic poles of the radial magnetic bearing is alternating in the rotational direction, and therefore there is a possibility that a large hysteresis loss and a large eddy current loss develop in each laminate of disk-shaped sheets mounted on the rotation shaft, thereby causing heat to be generated in the rotation shaft.

A radial magnetic bearing construction, designed to avoid these losses, is disclosed, for example, in U.S. Pat. No. 4,983,870. FIG. 2(a) is a cross-sectional view of a radial magnetic bearing portion of such a conventional construction, and FIG. 2(b) is a cross-sectional view of a rotor assembly.

In FIGS. 2(a) & 2(b) rotation shaft 246 includes flux transferring members (in the form of an I-shaped rotating laminate 258) dispersed in an I-shaped rotating laminate 260. The laminate 258 is larger in radial length than the laminate 260. The laminates 258 and 260 are held in a suitable position on the rotation shaft 246 by a restraint ring 262, associated with the rotation shaft 246, and a retaining member 250. Reference numeral 220 denotes a housing, reference numeral 212 a stator, reference numeral 214 the rotor assembly, and reference numeral 218 an electromagnet.

The retaining member 250 is welded to the rotation shaft 246, and includes an annular shoulder 263 embracing an end of the laminate 260. Rotating member bands 264 are provided in opposed relation to windings of magnetic coils 240, respectively, and serve to additionally hold the rotating laminates 258 and 260.

In the construction of FIGS. 2(a) & 2(b) the polarity of electromagnetic poles of the radial magnetic bearing is not alternating in a rotational direction. An eddy current loss tends to develop because of a change of a magnetic field intensity due to a construction in which magnetic pole-existing portions and magnetic polo-nonexisting portions alternate on the peripheral surface of a rotation shaft in a circumferential direction. In the construction of FIG. 2, however, the laminate of electromagnetic steel sheets, forming a passage for an eddy current, are insulated from one another in the circumferential direction, and therefore an eddy current is hardly produced, so that a bearing loss is extremely reduced.

Even in this construction, however, a large current loss still develops. The reason for this is that a bias current for producing a bias flux must always be flowed so that this radial magnetic bearing can effectively achieve its control function.

In order to save a waste of the bias current flowed so as to produce the bias flux, Japanese Utility Model Examined Publication No. 3-43467 discloses a conventional thrust magnetic bearing in which permanent magnets are provided in electromagnets. FIG. 3 is a cross-sectional view of such a conventional magnetic bearing.

In FIG. 3, a rotating member 302 is attracted upward or downward by an attraction force produced by an upper permanent magnet 305a or a lower permanent magnet 305b. In order to eliminate this imbalance force, the position of the rotating member is detected by a position detector 310, and a control current, corresponding to this position, is fed to coils 307a and 307b through a position controlling device 311 and an amplifier 312. As a result, the rotating member is held in a predetermined position in a thrust direction.

Yokes 304a and 304b each having annular teeth are disposed coaxially with each other, and therefore when the rotating member 302 is displaced in a radial direction, there is produced a magnetic restoring force tending to restore this rotating member into its original position where the rotating member is coaxial or concentric with a fixed member 301. Thus, the rotating member can be supported or borne in the thrust and radial directions.

In this conventional construction, since a bias flux is supplied by the permanent magnets 305a and 305b, the magnetic field polarity of each bearing surface of the rotation shaft, opposed to the thrust magnetic pole surface, is constant, and therefore an eddy current will not be produced in so far as the rotation shaft is displaced in the axial direction. However, this construction can not be directly applied, for example, to the radial magnetic bearing of FIG. 12.

SUMMARY OF THE INVENTION

This invention seeks to improve the conventional radial magnetic bearings, and an object of this invention to provide a magnetic bearing which has a very small bearing loss.

According to the present invention, there is provided a magnetic bearing comprising:
  a rotation shaft;
  a rotor core mounted on an outer periphery of the rotation shaft;
  a housing;
  radial stators fixedly mounted within the housing in opposed relation to the outer periphery of the rotor core, each of the radial stators cooperating with the rotor core to form a magnetic circuit, and each of the radial stators comprising (a) a radial stator core which includes at least one pair of yoke portions on which exciting coils for flowing control current therethrough are wound, respectively, and a body magnetically interconnecting the pair of yoke portions, and (b) a permanent magnet provided between the body and at least one of the yoke portions;
  a position sensor for detecting a radial position of the rotation shaft; and
  a control device responsive to a signal from the position sensor for causing the control current to flow through the exciting coils so as to control the radial position of the rotation shaft.

In one preferred form of the invention, the rotation shaft has a flange portion, and the magnetic bearing further comprises:
  thrust stators fixedly mounted on the housing in opposed relation respectively to opposite sides of the flange portion, each of the thrust stators comprising (a) a thrust stator core including at least one pair of yoke portions and a body magnetically interconnecting the pair of yoke portions, (b) an exciting coil, and (c) a permanent magnet provided between the body and at least one of the yoke portions;
  a position sensor for detecting an axial displacement of the rotation shaft; and
  a control device responsive to a signal from the position sensor for causing control current to flow through the exciting coil so as to control the axial position of the rotation shaft.

Preferably, there is provided a position adjusting mechanism for enabling the radial stators to move back and forth radially within the housing.

In the magnetic bearing of the present invention, at least three U-shaped stator cores are circumferentially arranged around a rotation shaft, and are fixedly mounted on a housing. Exciting coils are wound on a laminate of electromagnetic steel sheets constituting the stator core, and permanent magnets are provided in the laminate. Rotor cores, each comprising a laminate of I-shaped electromagnetic steel sheets stacked together in the circumferential direction, are mounted on the rotation shaft in such a manner that each rotor core is opposed to magnetic pole surfaces of the associated stator cores. In accordance with a signal from position sensors which detect the radial position of the rotation shaft, control current is caused to flow through the exciting coils to thereby control the position of the rotation shaft. Thus, merely by causing the control current to flow through the exciting coils when this is required, the control of the rotation shaft can be achieved, and with this method, the energy consumption can be much reduced.

In one preferred form of the invention, there is provided a device for radially guiding and moving the stator cores within the housing when mounting the stator cores on the housing Therefore, the stator cores are beforehand mounted on the housing in such a manner that the stator cores are sufficiently spaced from the rotation shaft, and then the stator cores are moved respectively to desired positions close to the rotation shaft, and are fixed to the housing. By doing so, there is avoided a situation in which the rotation shaft is attracted by the stator cores during the assembling of the magnetic bearing, and therefore the assembling is not difficult.

DESCRIPTION OF THE PREFERRED EMBODIMENTS OF THE INVENTION

First Embodiment

Figure 1:
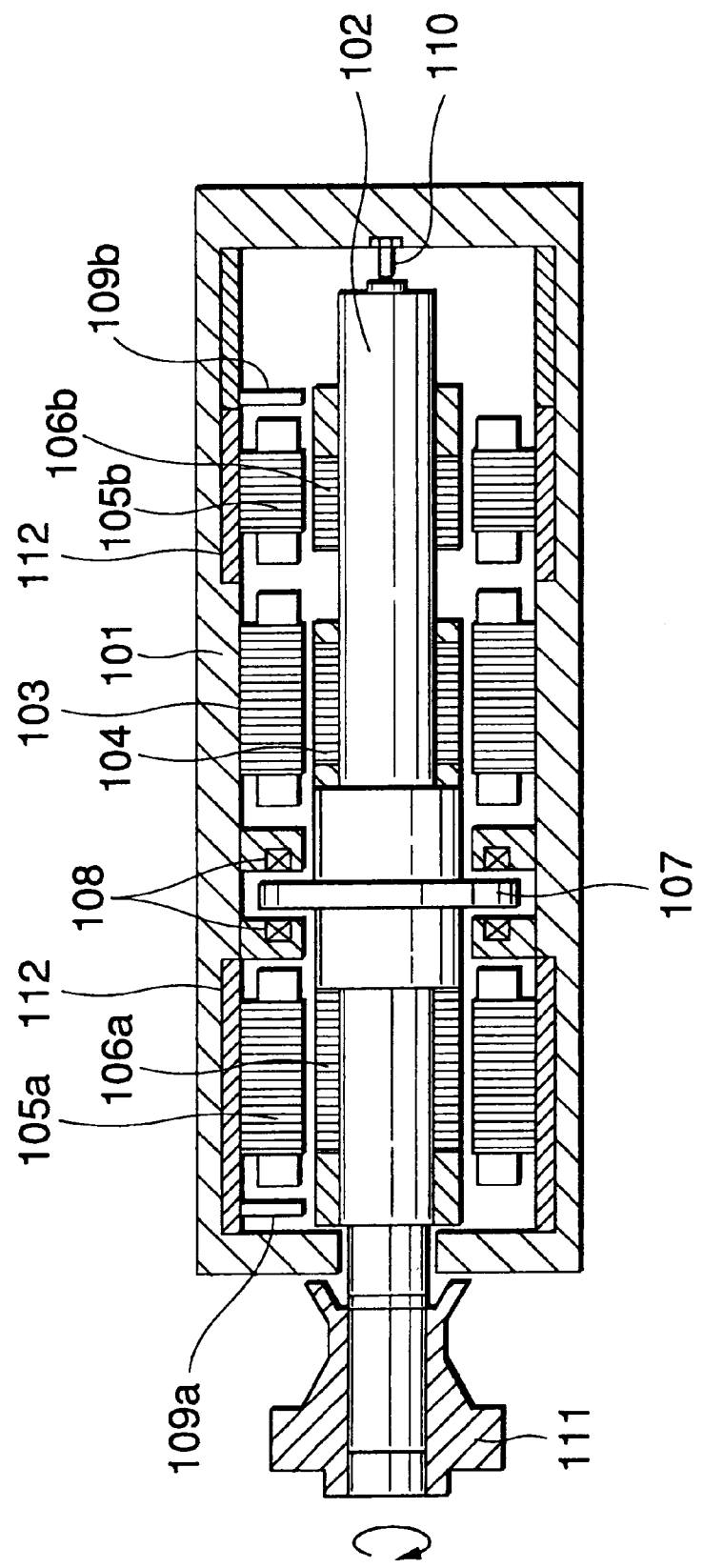
FIG. 1 is a cross-sectional view showing a conventional magnetic bearing.
Figure 2A:
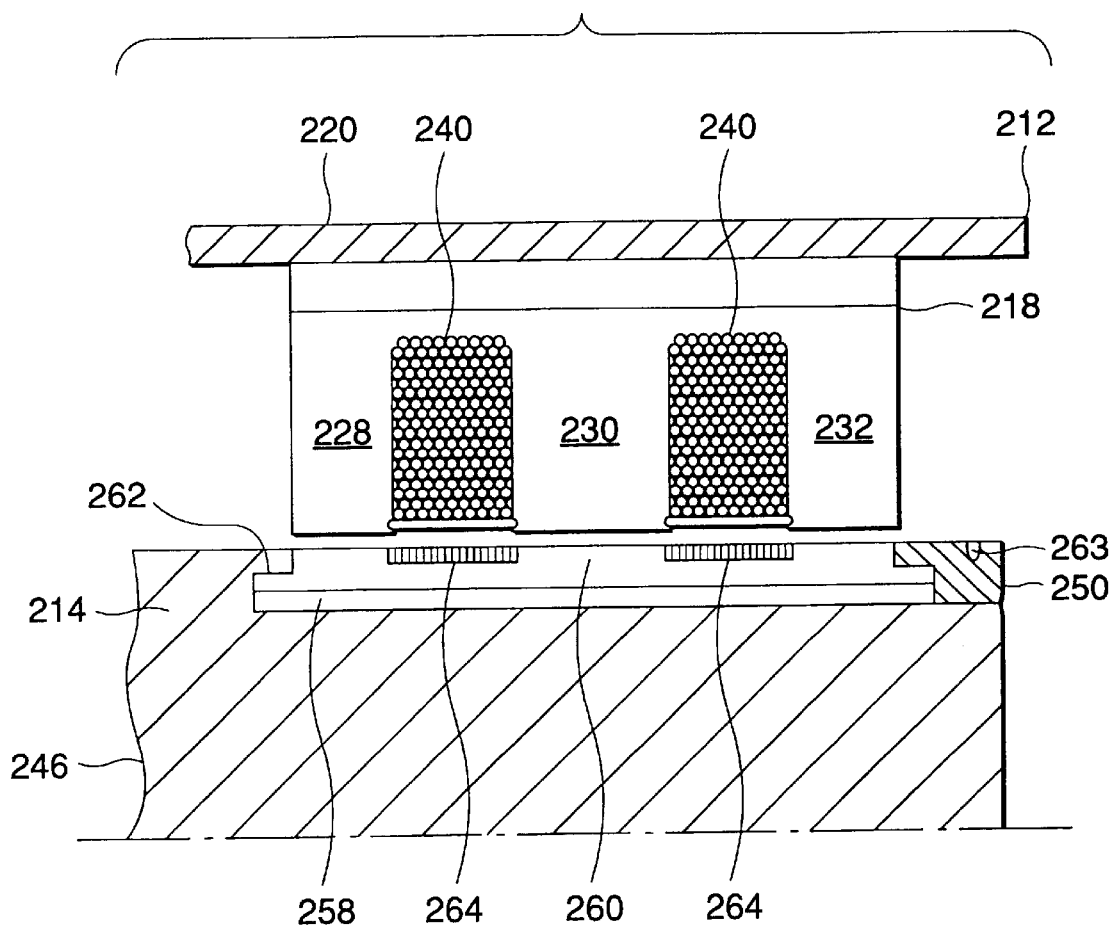
FIGS. 2(a) and 2(b) are cross-sectional views showing a conventional magnetic bearing.
Figure 2B:
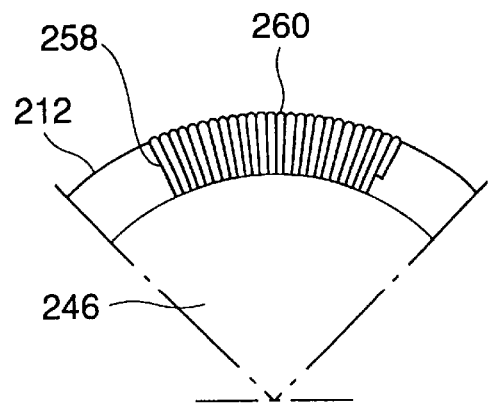
Figure 3:
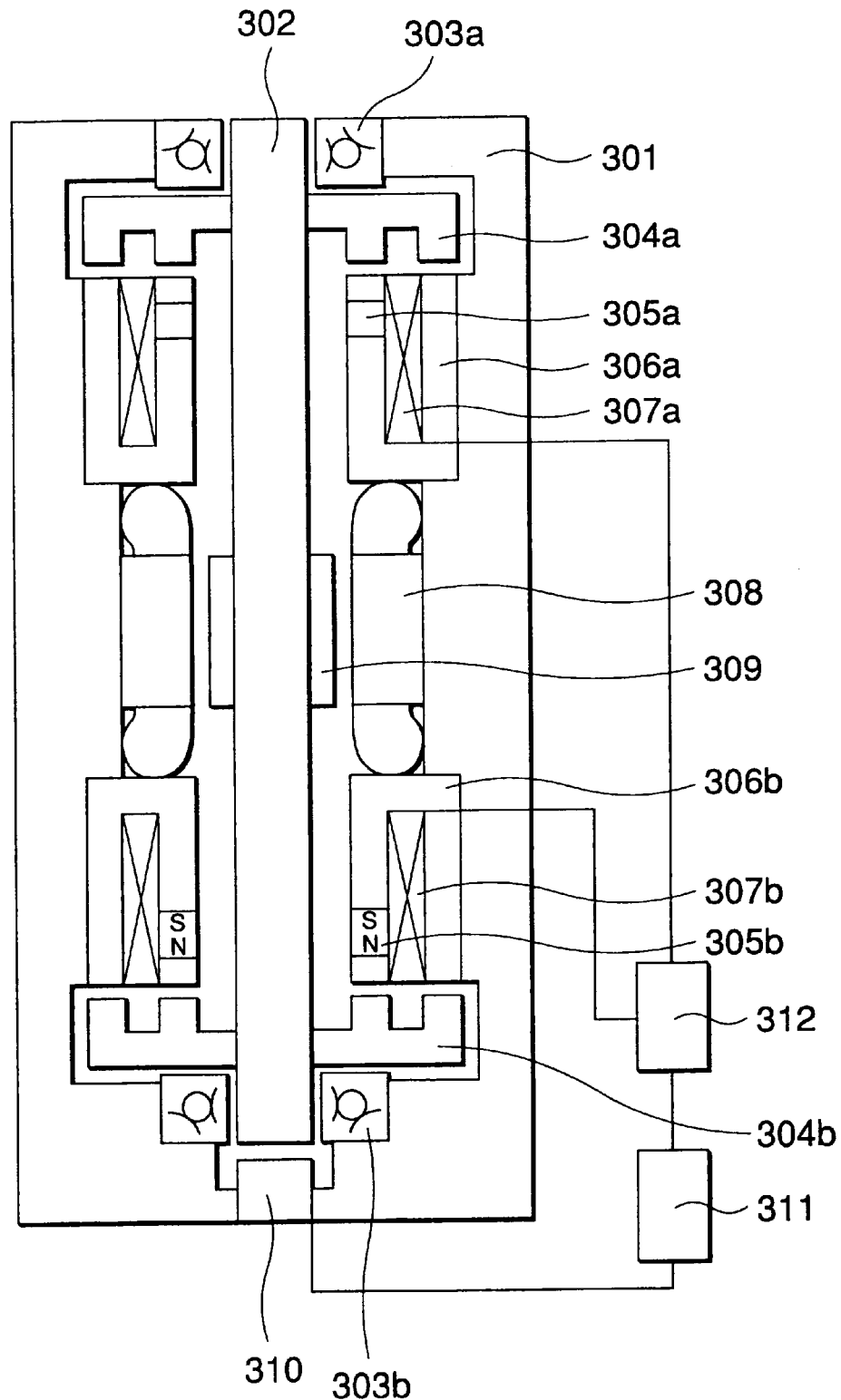
FIG. 3 is a cross-sectional view showing a conventional magnetic bearing.
Figure 4:
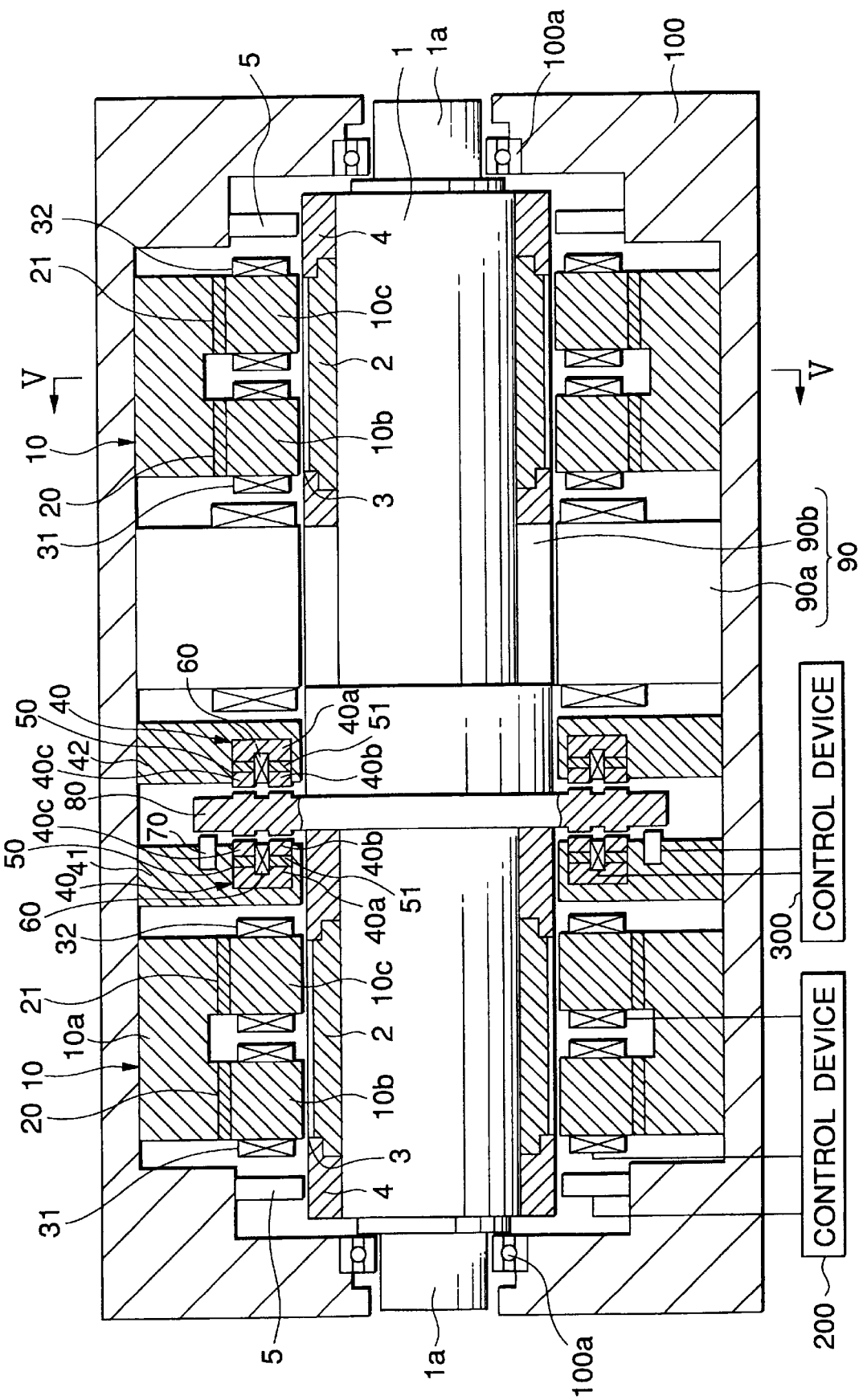
FIG. 4 is a longitudinal cross-sectional view of a first embodiment of a magnetic bearing of the present invention, taken through an axis thereof.
Figure 5:
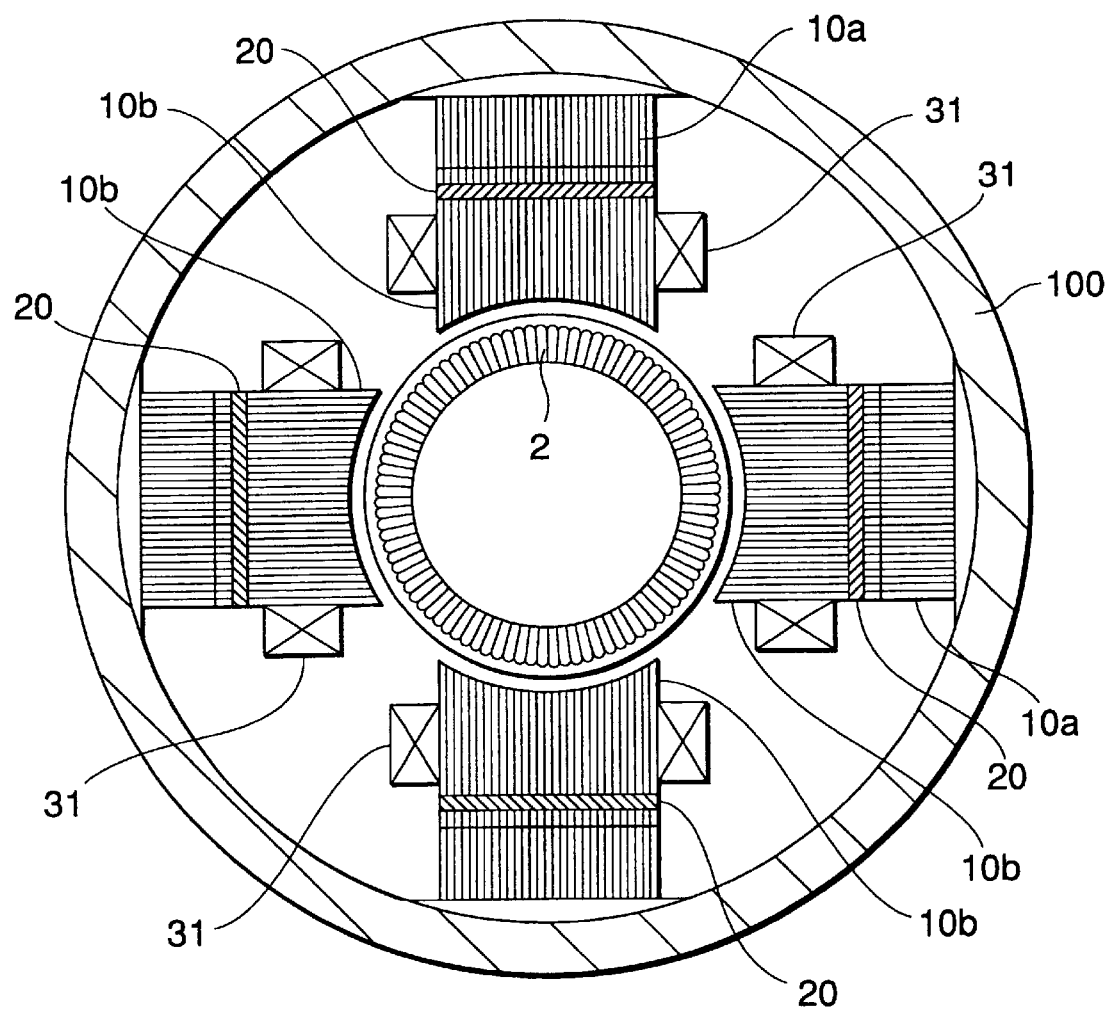
FIG. 5 is a cross-sectional view taken along the line V—V of FIG. 4.
Figure 6:
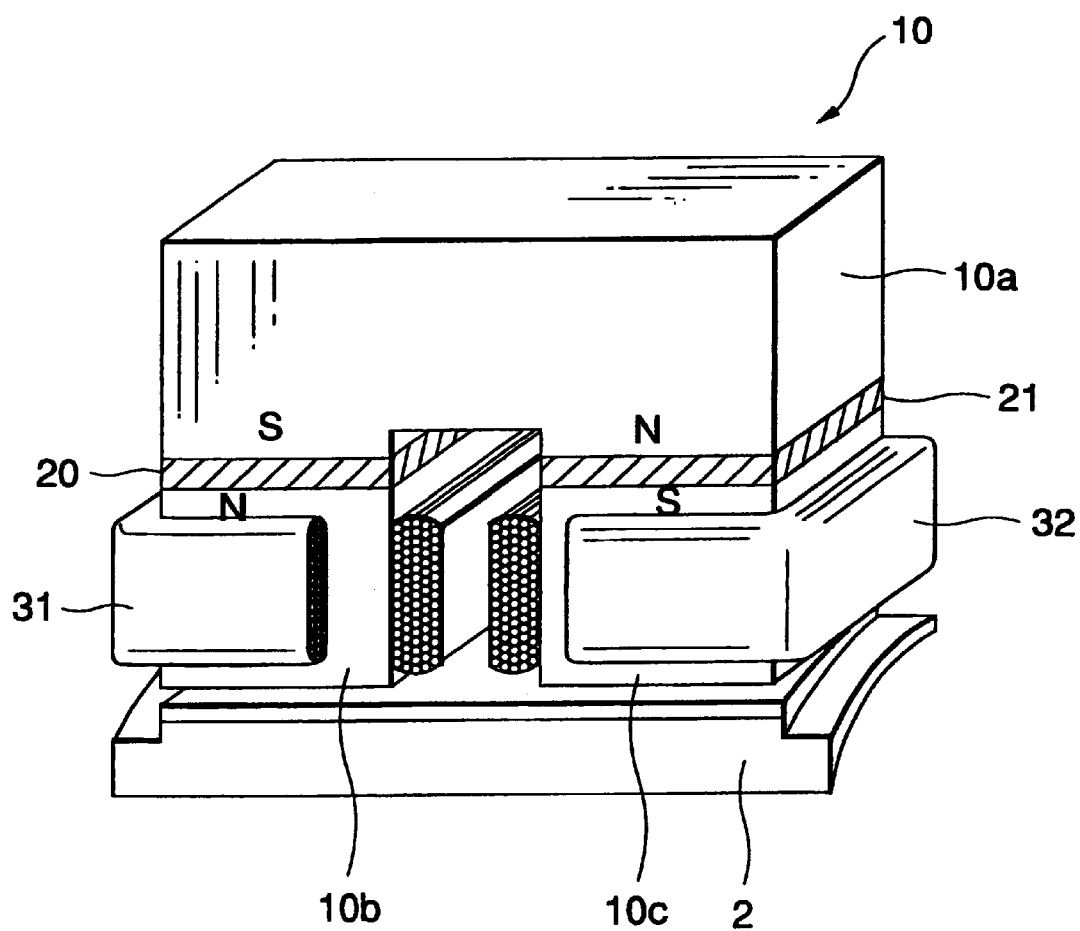
FIG. 6 is a perspective view of the radial magnetic bearing (corresponding to FIG. 5) of this embodiment.

A first embodiment of the present invention will now be described with reference to the drawings. FIG. 4 is a longitudinal cross-sectional view of the first embodiment of a magnetic bearing of the present invention, taken through an axis thereof. FIG. 5 is a cross-sectional view taken along the line V—V of FIG. 4. FIG. 6 is a perspective view of the radial magnetic bearing (corresponding to FIG. 5) of this embodiment, showing a cross-section of coils wound on stator magnetic poles.

A rotation shaft 1 is rotatably supported within a housing 100 in a manner described later. A radially-extending flange portion 80 is formed on a generally central portion of the rotation shaft 1. Rotor cores 2 are fitted respectively on those portions of an outer peripheral surface of the rotation shaft 1 disposed adjacent respectively to axial opposite ends thereof. The rotor core 2 comprises a laminate of I-shaped magnetic steel sheets stacked together in a circumferential direction.

A retaining member 3, molded into a winding by CFRP or the like, is provided on an outer periphery of each rotor core 2, and is fitted thereon to tighten the rotor core 2. Fixing rings 4 are provided respectively at axial opposite ends of each rotor core 2, and tighten the rotor core 2 in a radial direction, thereby fixing this rotor core relative to the rotation shaft 1.

Four laminates 10 of electromagnetic steel sheets (each constituting a U-shaped stator core (radial stator core) of the radial magnetic bearing) are disposed radially outwardly of the rotor core 2, and are arranged at equal intervals in the circumferential direction relative to the housing 100. If at least three electromagnetic steel sheet laminates 10 are provided, this is sufficient. Each of the electromagnetic steel sheet laminates 10 includes a body 10a, and two yoke portions 10b and 10c extending radially inwardly from the body 10a.

A flat plate-like permanent magnet 20 is provided between the yoke portion 10b and the body 10a, and also a flat plate-like permanent magnet 21 is provided between the yoke portion 10c and the body 10a. The permanent magnets 20 and 21 are opposite in polarity to each other in the radial direction. Exciting coils 31 and 32 are wound on the yoke portions 10b and 10c, respectively.

In this embodiment, there is further provided a thrust bearing which comprises annular members 40, which are made of a magnetic material, and have a U-shaped cross-section, and are provided respectively on opposite sides of the flange portion 80 formed on the rotation shaft 1, and are opposed to each other in coaxial relation to the axis of rotation, a pair of annular permanent magnets 50 and 51 provided in each of the cross-sectionally U-shaped annular members 40 in concentric relation to each other, exciting coils 60 received respectively in grooves of the cross-sectionally U-shaped annular members 40, axial displacement sensors 70 for detecting the axial position of the flange portion 80, and a control device 300 responsive to a signal from the axial displacement sensors 70 for energizing the exciting coils 60.

This construction will be described more specifically. The cross-sectionally U-shaped annular members 40 (each constituting a stator core (thrust stator core) of the thrust bearing) are mounted on the housing 100 through support members 41 and 42. Each of the annular members 40 includes a disk-shaped body 40a, a small annular yoke portion 40b, and a large annular yoke portion 40c, the annular yoke portions 40b and 40c extending from the body 40a in the axial direction.

The permanent magnet 50 is provided between the annular yoke portion 40c and the body 40a, and the permanent magnet 51 is provided between the annular yoke portion 40b and the body 40a, and the two permanent magnets 50 and 51 are opposite in polarity to each other in the axial direction. The exciting coil 60 is mounted in the channel-shaped groove in each annular member 40. The displacement sensors 70 are mounted on the support member 41 in opposed relation to an outer peripheral portion of one side of the flange portion 80.

Touch-down bearings 100a are disposed respectively around reduced-diameter portions 1a, formed respectively at the axially opposite ends of the rotation shaft 1, and are fixedly mounted on the housing 100. These bearings 100a are normally held out of contact with the reduced-diameter portions 1a, respectively. A stator 90a is provided at a generally central portion of the housing 100, and a rotor 90b is mounted on the rotation shaft 1 in opposed relation to this stator 90a. The stator 90a and the rotor 90b jointly constitute a drive motor 90.

The operation of this embodiment will now be described. First, the control of the radial position of the rotation shaft will be described. When the rotation shaft 1 is radially deviated from a position where attraction forces of the groups of permanent magnets 20 and 21 are balanced, the displacement sensors 5 detect this deviation amount. In this case, the displacement sensor 5 outputs a signal, representing the amount of deviation of the rotation shaft 1 and so on, to the control device 200.

The control device 200 causes a control current to flow through the exciting coils 31 and 32 so as to return the rotation shaft 1 to the target position. In accordance with the deviation amount detected by the displacement sensor 5, the control device changes the control current to zero when the position of the rotation shaft 1 is brought into agreement with the position where the attraction forces of the groups of permanent magnets 20 and 21 are balanced. Thus, the control device effects a so-called feedback control operation.

As a result, the rotation shaft 1 is returned to the position where the attraction forces of the groups of permanent magnets 20 and 21 are balanced, and in this condition, the control current is a very small current only for a derivative action for restraining a fine variation of the rotation shaft.

Figure 7:
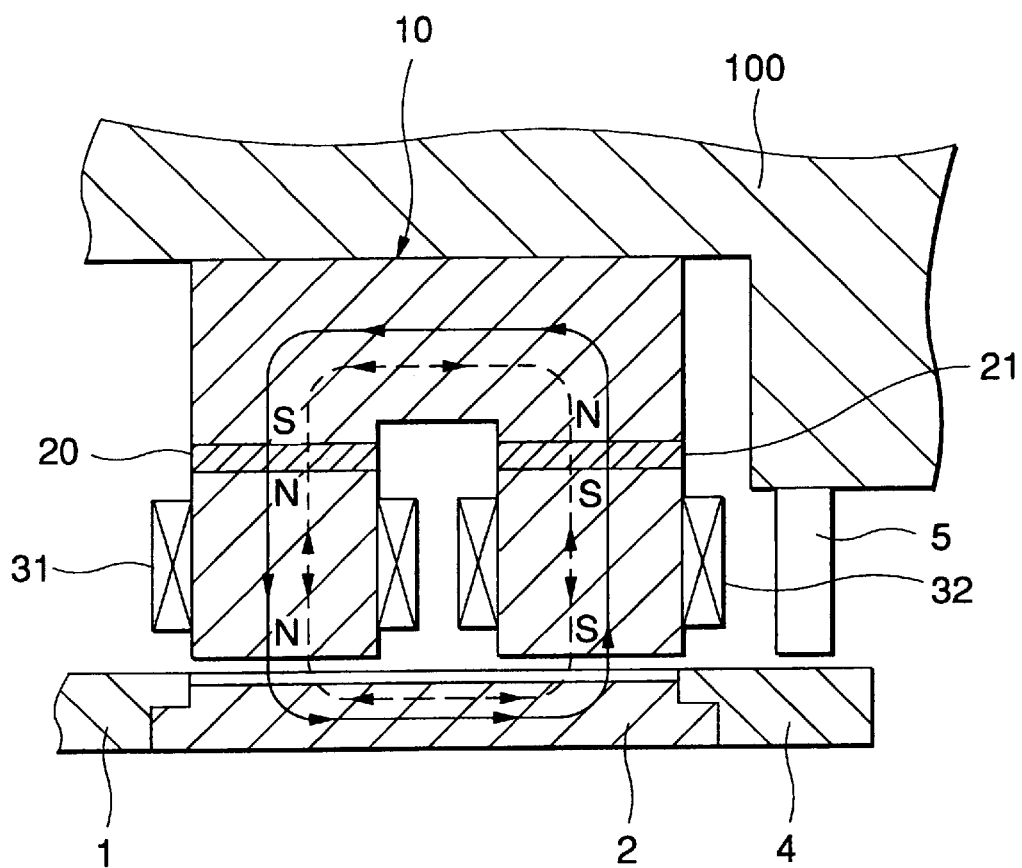
FIG. 7 is a cross-sectional view showing an electromagnetic steel sheet laminate 10 and its vicinities, and showing magnetic circuits.

FIG. 7 is a cross-sectional view showing the magnetic steel sheet laminate 10 and its vicinities, and shows magnetic circuits formed between the radial stator (comprising the magnetic steel sheet laminate 10, the permanent magnets 20 and 21 and the exciting coils 31 and 32) and the rotor core.

In FIG. 7, the main magnetic circuit, formed by magnetomotive forces of the two permanent magnets 20 and 21, is indicated by a solid line, and the control magnetic circuit, formed by the control current flowing through the exciting coils 31 and 32, is indicated by a broken line. Depending on the direction of the magnetic flux of the control magnetic circuit, this flux increases or decreases the magnetic flux of the main magnetic circuit. When the rotation shaft 1 moves away from the position where the attraction forces of the groups of permanent magnets 20 and 21 are balanced, the direction of the flux of the control magnetic circuit becomes the same as the direction of the flux of the main magnetic circuit, and this flux is added to the main magnetic circuit. In contrast, when the rotation shaft 1 moves toward the above position, the direction of the flux of the control magnetic circuit becomes opposite to that of the direction of the flux of the main magnetic circuit, so that the former flux decreases the latter flux. When the rotation shaft 1 reaches the balanced position, the control current becomes only a derivative action current, and hardly flows as described above, and therefore the energy consumption is reduced.

Next, the control of the thrust position of the rotation shaft will be described. In FIG. 4, when the rotation shaft 1 is axially deviated from a position where attraction forces of the groups of permanent magnets 50 and 51 of the thrust stator are balanced, the displacement sensors 70 detect this deviation amount. In this case, the displacement sensor 70 outputs a signal, representing the amount of deviation of the rotation shaft 1 and so on, to the control device 300.

The control device 300 causes a control current to flow through the exciting coils 60 so as to return the rotation shaft 1 to the target position. In accordance with the deviation amount detected by the displacement sensor 70, the control device 300 changes the control current to zero when the position of the rotation shaft 1 is brought into agreement with the position where the attraction forces of the groups of permanent magnets 50 and 51 are balanced. Thus, the control device effects a so-called feedback control operation.

As a result, the rotation shaft 1 is returned to the position where the attraction forces of the groups of permanent magnets 50 and 51 are balanced, and in this condition, the control current is a very small current only for a derivative action for restraining a fine variation of the rotation shaft.

Figure 8:
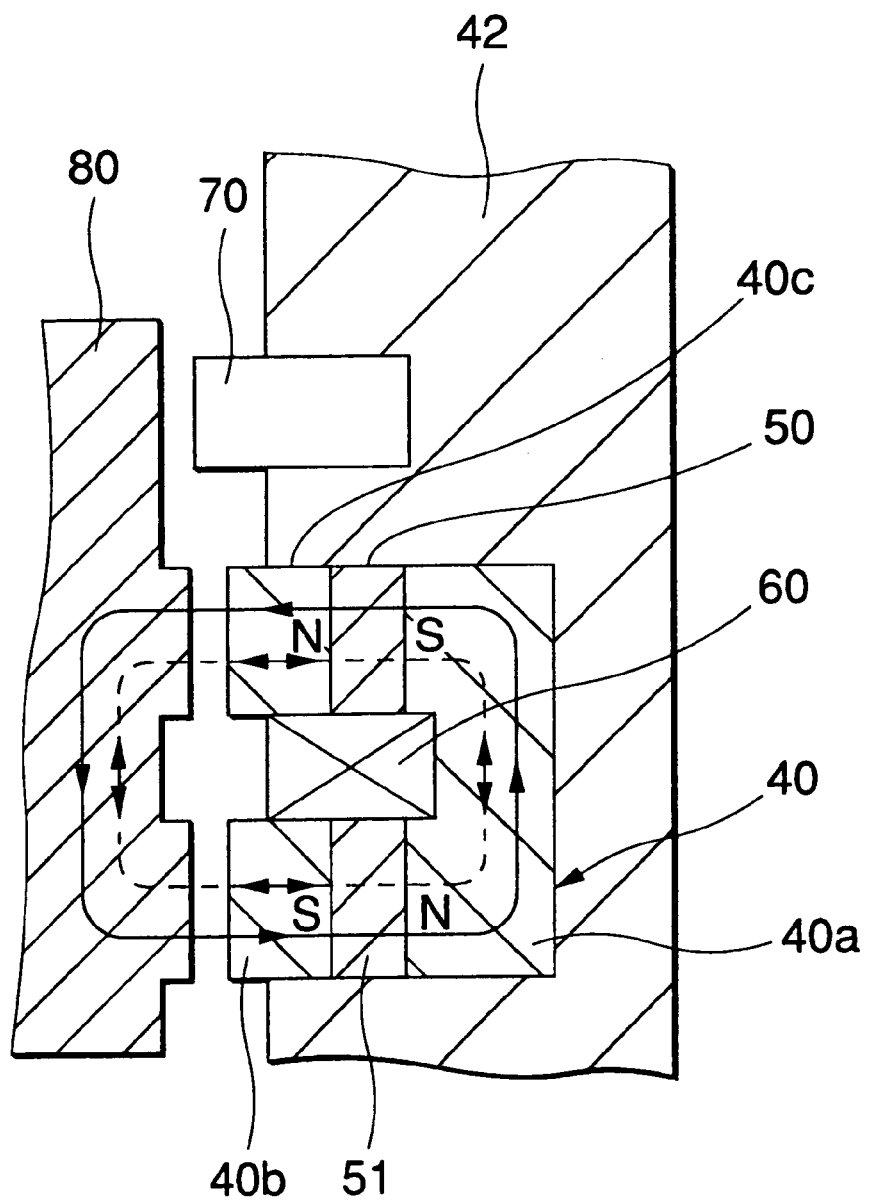
FIG. 8 is a cross-sectional view showing an annular members 40 of FIG. 4 and its vicinities, and showing magnetic circuits.

FIG. 8 is a cross-sectional view showing the annular members 40a, 40b and 40c and their vicinities, and shows magnetic circuits formed by the annular members 40a, 40b and 40c, the permanent magnets 50 and 51 and the exciting coil 60.

In FIG. 8, the main magnetic circuit, formed by magnetomotive forces of the two permanent magnets 50 and 51, is indicated by a solid line, and the control magnetic circuit, formed by the control current flowing through the exciting coil 60, is indicated by a broken line. Depending on the direction of the magnetic flux of the control magnetic circuit, this flux increases or decrease the magnetic flux of the main magnetic circuit. When the rotation shaft 1 moves away from the position where the attraction forces of the groups of permanent magnets 50 and 51 are balanced, the direction of the flux of the control magnetic circuit becomes the same as the direction of the flux of the main magnetic circuit, and this flux is added to the main magnetic circuit. In contrast, when the rotation shaft 1 moves toward the above position, the direction of the flux of the control magnetic circuit becomes opposite to that of the direction of the flux of the main magnetic circuit, so that the former flux decreases the latter flux. When the rotation shaft 1 reaches the balanced position, the control current becomes only a derivative action current, and hardly flows, and therefore the energy consumption is reduced.

In the illustrated embodiment, although the two permanent magnets 20 and 21 are provided in the magnetic steel sheets 10 of the stator core of the radial bearing, only one permanent magnet may be provided. Although the two permanent magnets 50 and 51 are provided in the annular member 40 of the stator core of the thrust bearing, only one permanent magnet may be provided.

Second Embodiment

Figure 9:
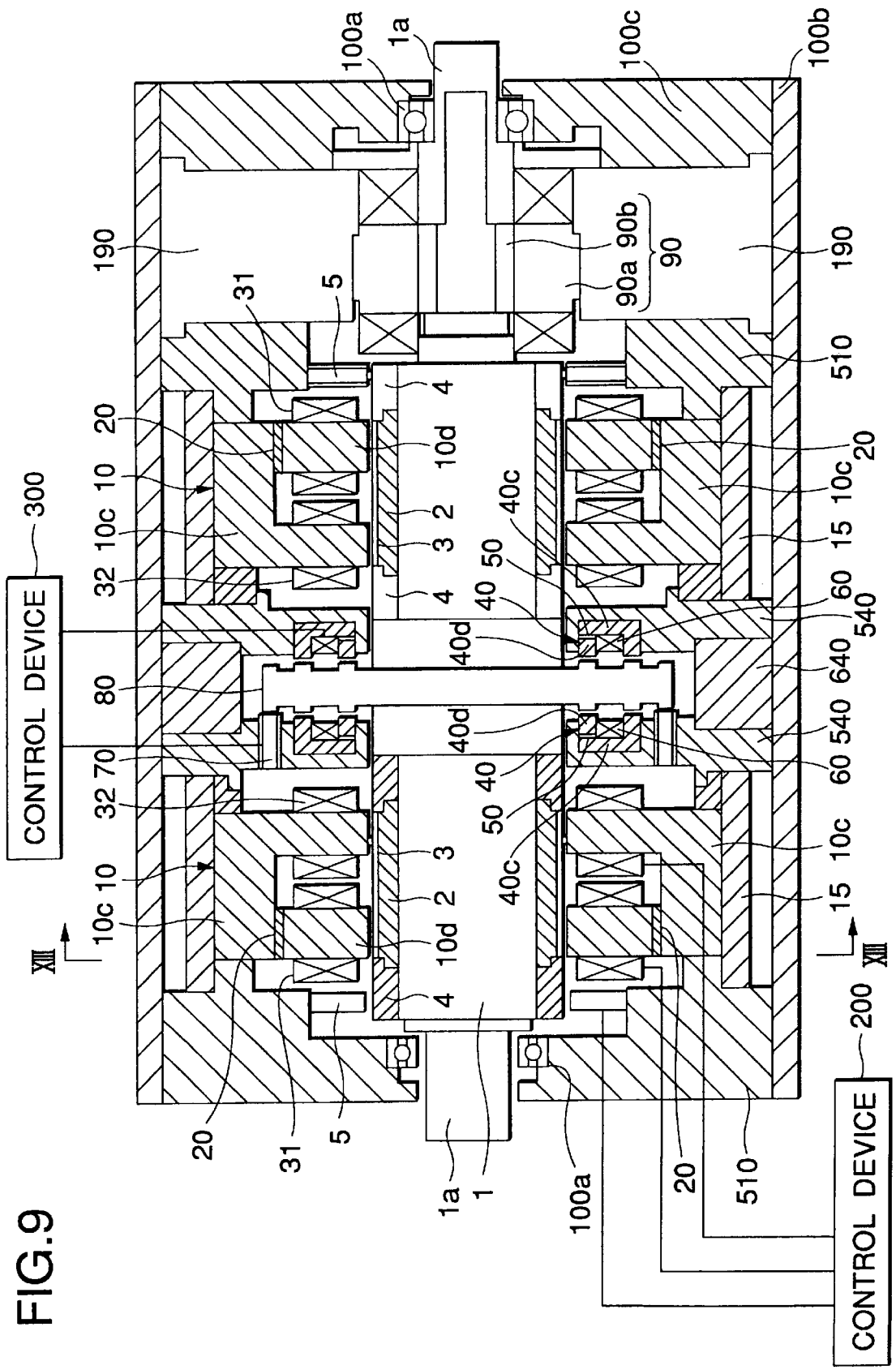
FIG. 9 is a longitudinal cross-sectional view of a second embodiment of a magnetic bearing of the present invention, taken through an axis thereof.
Figure 10:
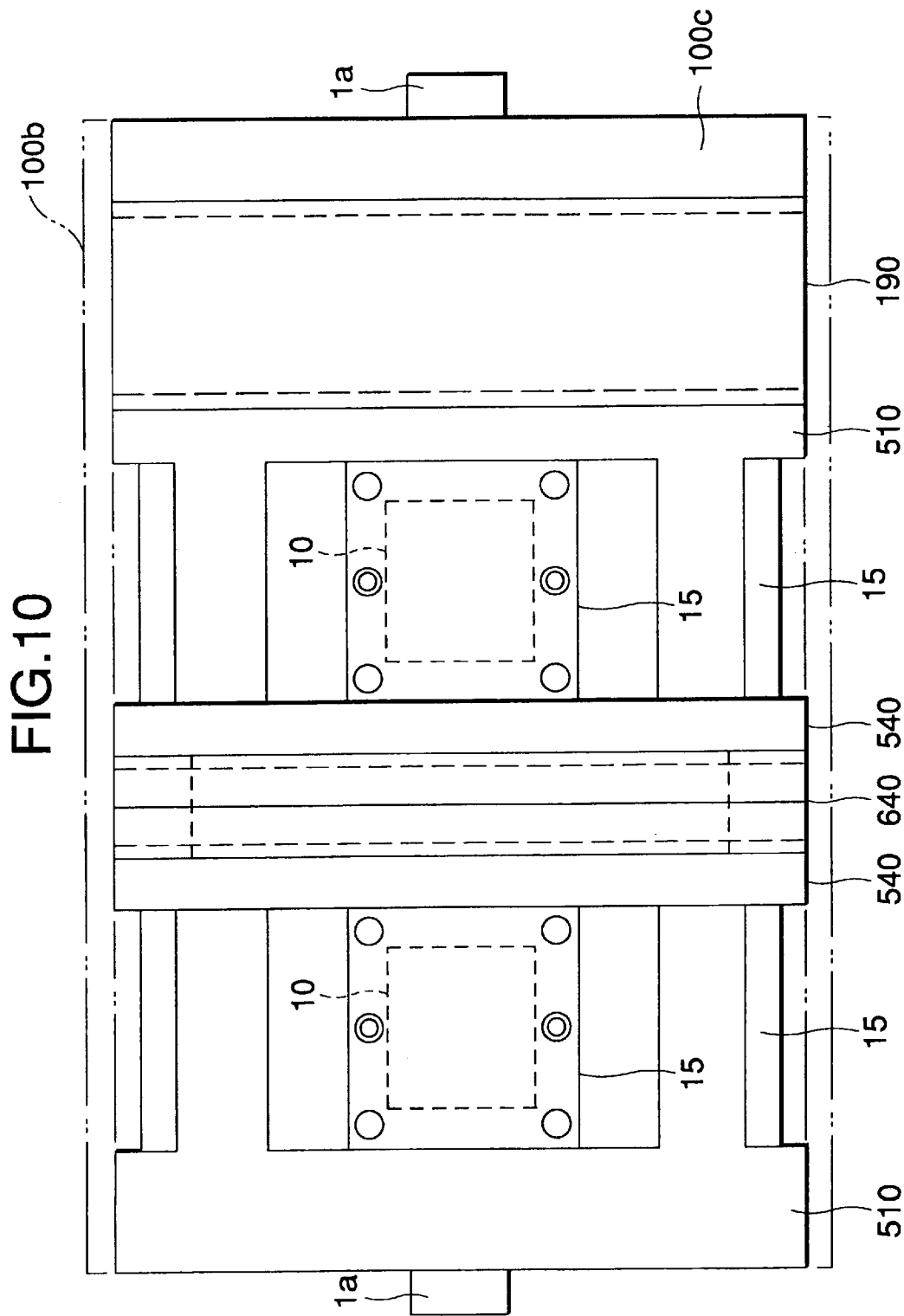
FIG. 10 is a plan view of the magnetic bearing of FIG. 9, with an outer tube removed.
Figure 11:
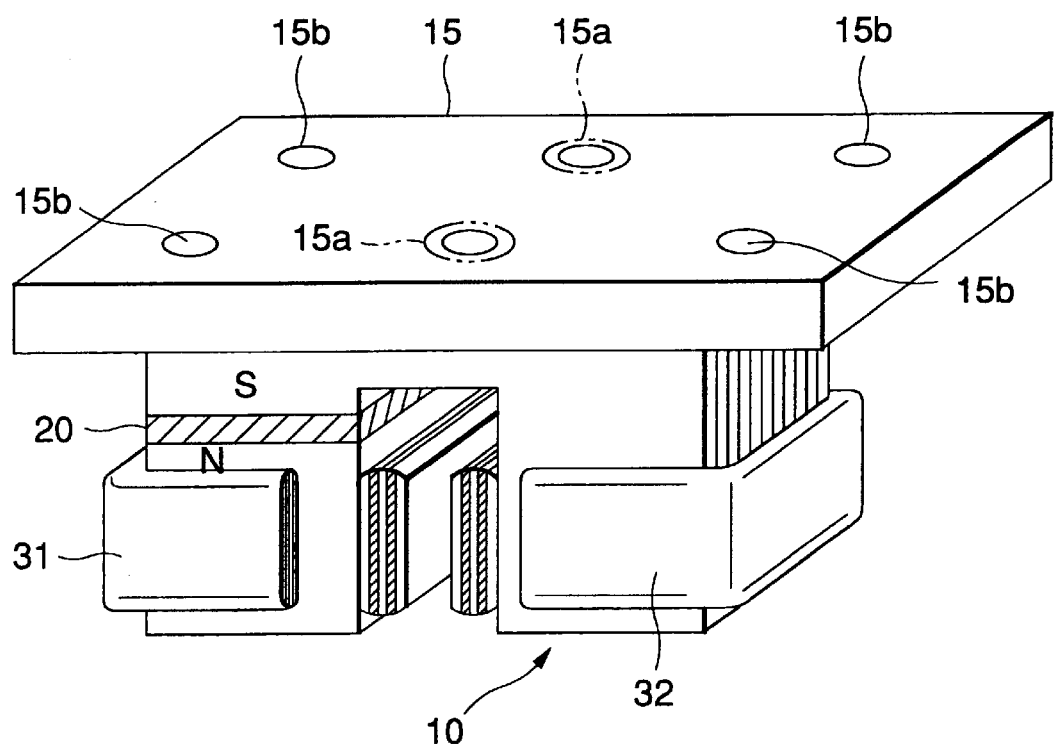
FIG. 11 is a perspective view of an important portion of the radial magnetic bearing of this embodiment.
Figure 12:
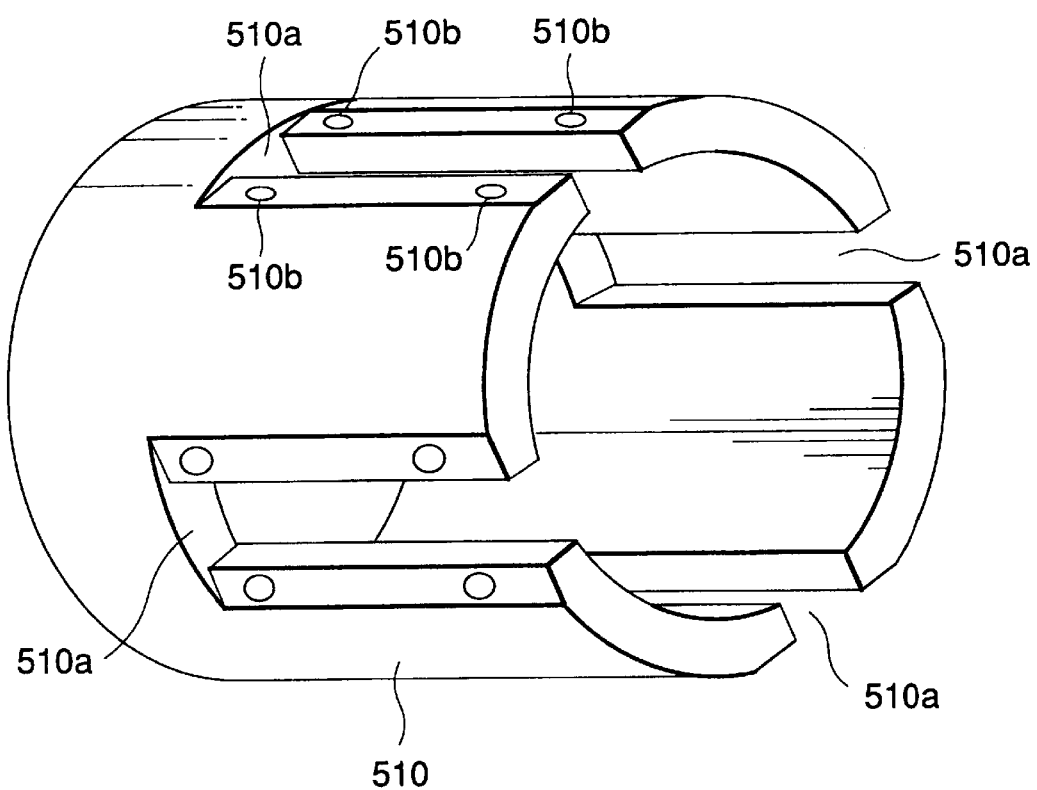
FIG. 12 is a perspective view of a radial housing.
Figure 14:
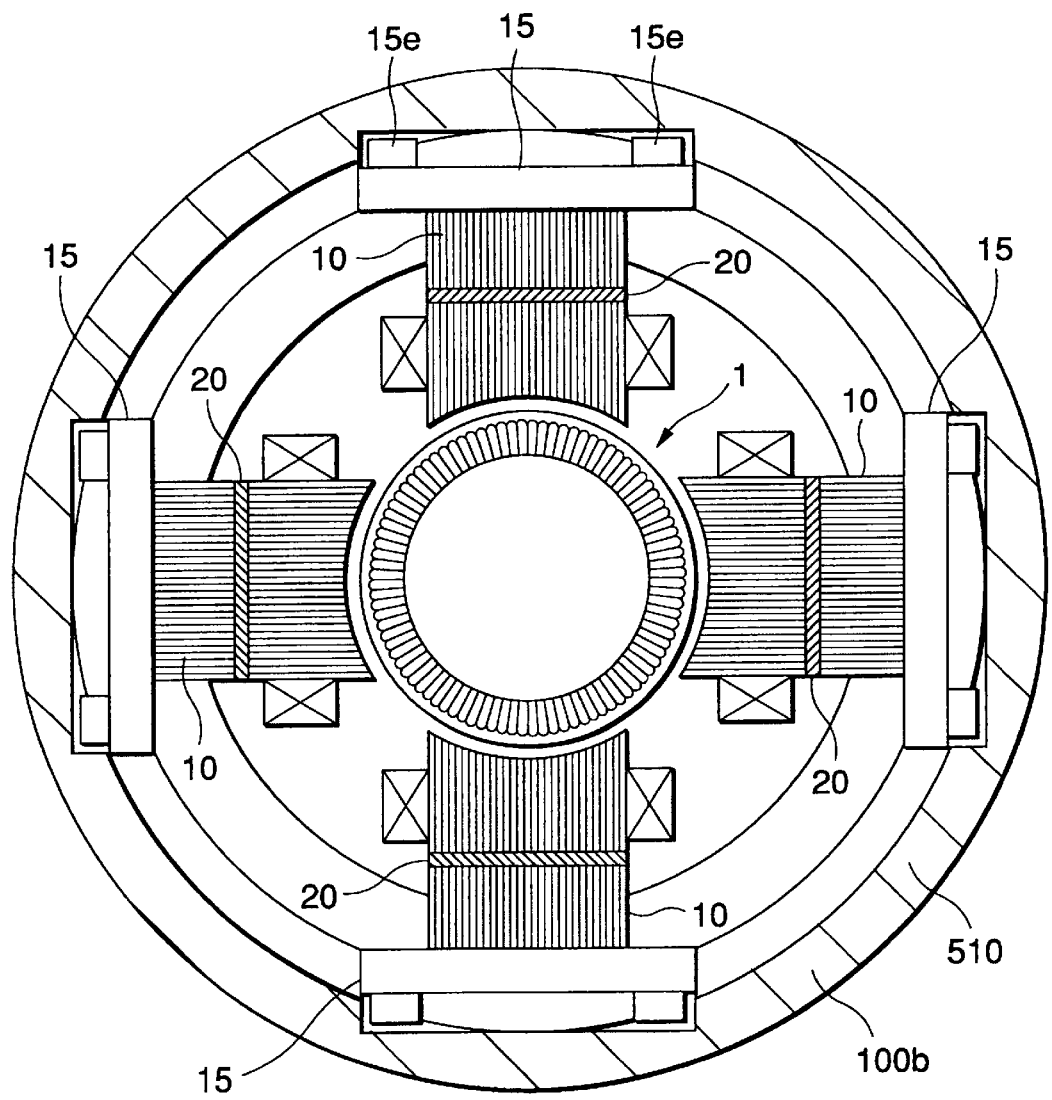
FIG. 14 is a cross-sectional view taken along the line XIII—XIII of FIG. 9, showing the magnetic bearing in its assembled condition.

FIG. 9 is a longitudinal cross-sectional view of a second embodiment of a magnetic bearing of the present invention, taken through an axis thereof. FIG. 10 is a plan view of the magnetic bearing, with an outer tube removed. FIG. 14 is a cross-sectional view taken along the line XIII—XIII of FIG. 9. FIGS. 11 and 12 are views explanatory of the construction of a radial stator and the construction of a radial housing, respectively.

The magnetic bearing of the second embodiment is a modified form of the magnetic bearing of the first embodiment, and corresponding portions will be designated by identical reference numerals, respectively.

As shown in FIGS. 9 and 10, a rotation shaft 1 is rotatably supported by the magnetic bearing covered with the outer tube 100b, and is disposed coaxially with this magnetic bearing. As in the first embodiment, a flange portion 80 and rotor cores 2 are formed on the rotation shaft 1.

As described above, the rotor core 2 comprises a laminate of I-shaped magnetic steel sheets, and a ring-shaped retaining member 3, molded Into a winding by CFRP or the like, is fitted on each rotor core 2 to tighten the rotor core 2. Fixing rings 4 are provided respectively at opposite ends of the rotor core 2, and tighten the rotor core 2 in a radial direction, thereby fixing this rotor core relative to the rotation shaft 1. The provision of the retaining member 3 is not absolutely necessary.

Each laminate 10 of electromagnetic steel sheets (constituting a U-shaped stator core (radial stator core) of the radial magnetic bearing) includes a first portion 10c of an L-shaped cross-section, and a second portion 10d of an I-shaped cross-section, and a permanent magnet 20 is interposed between the two portions 10c and 10d. Exciting coils 31 and 32 are wound respectively on the two portions 10d and 10c. The electromagnetic steel sheet laminate 10 is fixed to the radial housing 510 through a mounting plate 15 to which this laminate 10 is fixedly secured.

When the rotation shaft 1 is deviated in a radial direction, that is, the shaft 1 is radially deviated from a position where attraction forces of the permanent magnets 20, constituting the group of stators comprising the four radial stators, are balanced, this deviation amount is detected by radial displacement sensors 5. A detection signal, outputted from the radial displacement sensor 5, is inputted to a control device 200 as described above for the first embodiment. This control device causes a control current to flow through the exciting coils 31 and 32 by a feedback control so as to return the rotation shaft 1 to the balanced condition, that is, the target position.

Annular members 40, which are made of a magnetic material, an have a U-shaped cross-section, are provided in opposed relation respectively to opposite sides of the flange portion 80 formed on the rotation shaft 1, and each of the annular members 40 includes a first portion 40c of an L-shaped cross-section, and a second portion 40d of an I-shaped cross-section, and a permanent magnet 50 is interposed between the two portions 40c and 40d. An exciting coil 60 is received in an annular groove formed by the two portions 40c and 40d. The annular members 40 are fixedly mounted respectively on a pair of thrust housings 540. The gap between the two thrust housings 540 is suitably determined by a spacer 640, and the flange portion 80 can rotate in this gap without friction.

When the rotation shaft 1 is deviated in the axial direction, that is, the shaft 1 is axially deviated from a position where attraction forces of the permanent magnets 50, constituting the thrust stators, are balanced, this deviation amount is detected by axial displacement sensors 70. A detection signal, outputted from the axial displacement sensor 70, is inputted to the control device 300 as described above for the first embodiment, and this control device causes a control current to flow through the exciting coils 60 by a feedback control so as to return the rotation shaft 1 to the balanced condition, that is, the target position.

A drive motor stator 90a is provided within a drive motor housing 190, and cooperates with a drive motor rotor 90, mounted on the rotation shaft 1, to rotate the rotation shaft 1. Touch-down bearings 100a are mounted respectively on a protection bearing housing 100c and the radial housing 510, and prevent the rotation shaft 1 from contacting the housings in the event of an abnormal rotation of the rotation shaft 1, thereby preventing the rotation shaft from damage.

FIG. 11 is a view explaining the construction of the radial stator having the electromagnetic steel sheet laminate 10 fixedly secured to the mounting plate 15. Each electromagnetic steel sheet laminate 10, constituting the U-shaped stator core, is integrally fixed to the mounting plate 15 by welding or bonding. Assembling screw holes 15a, used when assembling the magnetic bearing, and mounting screw holes 15b, used when finally fixing the electromagnetic steel sheet laminate 10, are formed through the mounting plate 15.

FIG. 12 is a view explaining the construction of the radial housing 510. Each radial stator (shown in FIG. 11) is mounted at a corresponding mounting guide portion 510a of the tubular radial housing 510 in such a manner that the radial stator can be moved radially. Mounting screw holes 510b for fixedly securing the mounting plate 15 to the radial housing 510 are formed around each mounting guide portion 510a.

Figure 13:
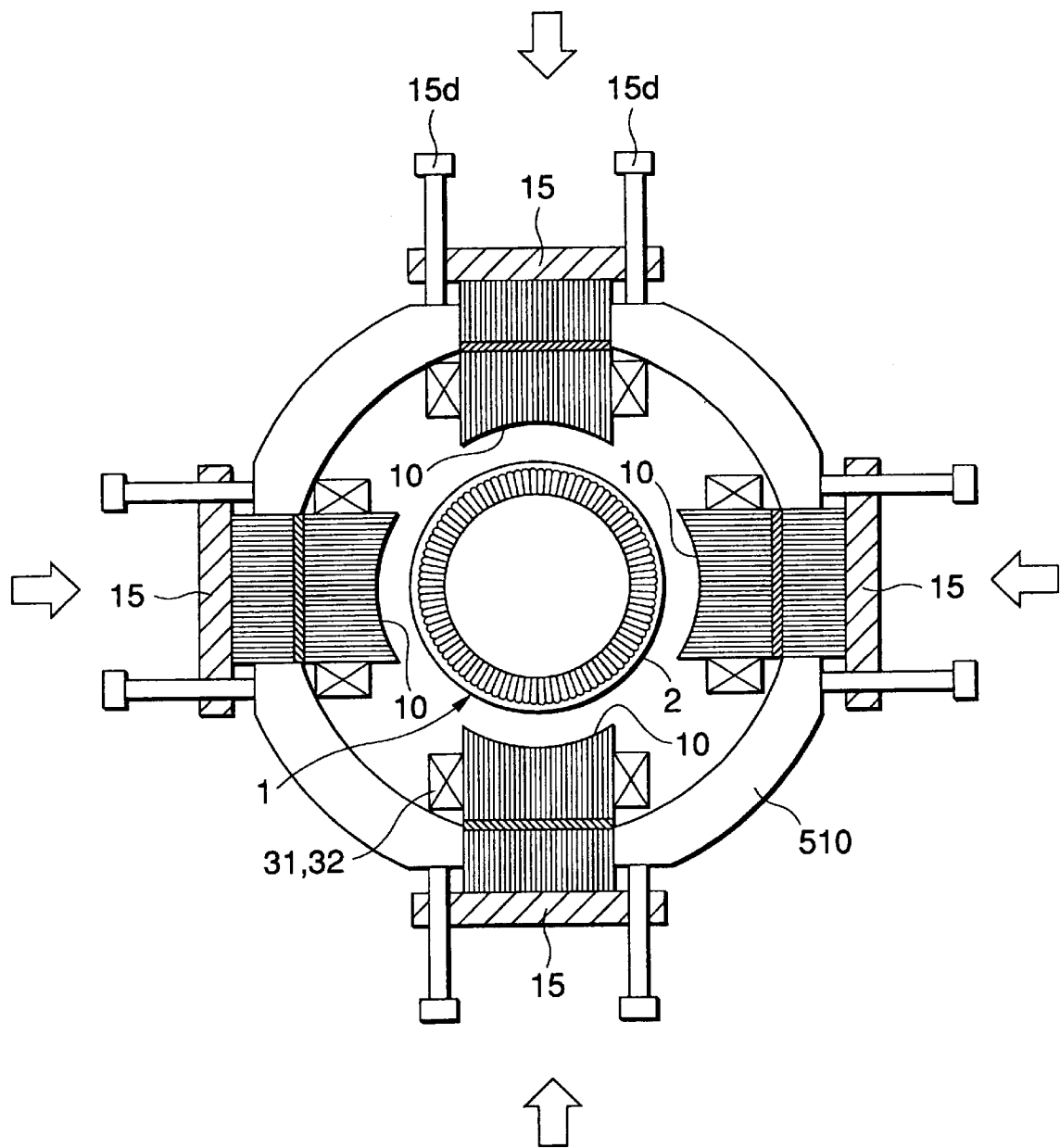
FIG. 13 is a cross-section view taken along the line XIII—XIII of FIG. 9, showing the magnetic bearing in the process of being assembled.

The assembling of the magnetic bearing, shown in FIGS. 9 and 10, will now be described. The drive motor stator 90a is beforehand fixedly mounted within the drive motor housing 190. The pair of annular members 40 are fixedly mounted on the pair of thrust housings 540, respectively. Further, the four electromagnetic steel sheet laminates 10 are mounted on each of the two radial housings 510 by assembling screws 15d as shown in FIG. 13. In this condition in which the exciting coils 31 and 32 of each laminate 10 are disposed radially inwardly of a cylindrical portion of the radial housing 510 while the mounting plate 15 is disposed radially outwardly of this cylindrical portion, the electromagnetic steel sheet laminate 10 can be guided radially of the radial housing 510 to be moved back and forth by adjusting the assembling screws 15d (FIG. 13 shows a condition in which the electromagnetic steel sheet laminates 10 are retracted outwardly away from the center of the radial housing).

Next, the spacer 640 is mounted around the outer periphery of the flange portion 80 formed on the rotation shaft 1, and the thrust housings 540 are mounted respectively on the opposite sides of the flange portion 80. The protection bearing housing 100c, the drive motor housing 190, the pair of thrust housings 540, the pair of radial housings 510 and the spacer 640 are integrally connected together to form a tubular stator assembly, and the rotation shaft 1 is incorporated in the tubular stator assembly comprising the housings 190, 510 and 540.

As shown in FIG. 13, the electromagnetic steel sheet laminates 10 are sufficiently spaced from the rotation shaft 1, and therefore any difficulty is not encountered with the assembling operation in which the rotation shaft 1 is incorporated in the stator assembly comprising the protection bearing housing 100c, the drive motor housing 190, the thrust housings 540, the radial housings 510 and the spacer 640. Namely, during the assembling operation, the rotation shaft 1 will not be attracted by the electromagnetic steel sheet laminates 10 of the radial stators under the influence of the attraction forces of the permanent magnets 20 of the radial stators, and therefore the assembling is not difficult.

After the rotation shaft 1 is thus mounted in the stator assembly, the assembling screws 15d are loosened and removed, and each mounting plate 15 is fixedly secured to the radial housing 510 by mounting screws 15e as shown in FIG. 14, so that each electromagnetic steel sheet laminate 10 is fixedly located close to the rotation shaft 1.

Finally, the outer tube 100b is fitted on the stator assembling comprising the drive motor housing 190, the thrust housings 540 and the radial housings 510, thus completing the magnetic bearing.

In the above second embodiment, although each mounting plate is, holding the electromagnetic stool sheet laminate 10, is fixed to the radial housing 510 by the mounting screws 15e, the fixing by the mounting screws 15e may be replaced by the fixing by bonding.

In the magnetic bearing of the present invention, at least three U-shaped stator cores are circumferentially arranged around the rotation shaft, and are fixedly mounted on the housing. The exciting coils are wound on the laminate of electromagnetic steel sheets constituting the stator core, and the permanent magnets are provided in the laminate. The rotor cores, each comprising a laminate of I-shaped electromagnetic steel sheets stacked together in the circumferential direction, are mounted on the rotation shaft in such a manner that each rotor core is opposed to the magnetic pole surfaces of the associated stator cores. In accordance with a signal from the position sensors which detect the radial position of the rotation shaft, the control current is caused to flow through the exciting coils to thereby control the position of the rotation shaft. Thus, merely by causing the control current to flow through the exciting coils when this is required, the control of the rotation shaft can be achieved, and with this method, the energy consumption can be much reduced.

In one preferred form of the invention, there is provided the device for radially guiding and moving the stator cores within the housing when mounting the stator cores on the housing. Therefore, the stator cores are beforehand mounted on the housing in such a manner that the stator cores are sufficiently spaced from the rotation shaft, and then the stator cores are moved respectively to desired positions close to the rotation shaft, and are fixed to the housing. By doing so, the assembling of the magnetic bearing can be effected easily and positively.

What is claimed is:

1. A magnetic bearing comprising:

a rotation shaft;

a rotor core mounted on an outer periphery of said rotation shaft;

a housing;

radial stators fixedly mounted within said housing in opposed relation to the outer periphery of said rotor core, each of said radial stators cooperating with said rotor core to form a magnetic circuit, wherein each of said radial stators comprises a radial stator core which includes at least one pair of yoke portions on which exciting coils for flowing control current therethrough are wound, respectively, and a body magnetically interconnecting said pair of yoke portions, and, a permanent magnet provided between said body and at least one of said yoke portions;

a position sensor for detecting a radial position of said rotation shaft; and a control device responsive to a signal from said position sensor for causing the control current to flow through said exciting coils so as to control the radial position of said rotation shaft, wherein said control device changes the control current so that the control current flowing through said exciting coils becomes zero, when the radial position of said rotation shaft coincides with a balanced position in which the attraction forces of said permanent magnets are balanced, and in a loading state after changing the control current, said control device performs a feedback control to use the balanced position of said rotation shaft as a target position.

2. The magnetic bearing according to claim 1, in which said rotation shaft comprises a flange portion, and said magnetic bearing further comprises:

thrust stators fixedly mounted on said housing in opposed relation respectively to opposite sides each of said flange portion, each of said thrust stators comprising, a thrust stator core including at least one pair of yoke portions and a body magnetically interconnecting said pair of yoke portions, an exciting coil received in a groove defined by said at least one pair of yoke portions, and a permanent magnet provided between said body and at least one of said yoke portions;

a position sensor for detecting an axial displacement of said rotation shaft; and a control device responsive to a signal from said position sensor for causing control current to flow through said exciting coil so as to control the axial position of said rotation shaft, wherein said control device changes the control current so that the control current flowing through said exciting coils becomes zero, when the axial position of said rotation shaft coincides with a balanced position in which the attraction forces of said permanent magnets are balanced, and in a loading state after changing of the control current, said control device performs a feedback control to use the balanced position of said rotation shaft as a target position.

3. The magnetic bearing according to claim 2, wherein said magnetic circuit comprises:

a main magnetic circuit produced between said permanent magnet, provided in said radial stator, and said rotation shaft, and a control magnetic circuit produced by said exciting coil, wound around said radial stator, and said rotation shaft, and wherein said control device performs addition or subtraction to a flux strength of said main magnetic circuit in accordance with a flux strength of said control magnetic circuit and a distance from said target position of said rotation shaft.

4. The magnetic bearing according to claim 2, further comprising:

a position adjusting mechanism for enabling said radial stators to move back and forth radially within said housing.

5. The magnetic bearing according to claim 3, further comprising:

a position adjusting mechanism for enabling said radial stators to move back and forth radially within said housing.

6. The magnetic bearing according to claim 1, wherein said magnetic circuit comprises:

a main magnetic circuit produced between said permanent magnet, provided in said radial stator, and said rotation shaft, a control magnetic circuit produced by said exciting coil, wound around said radial stator, and said rotation shaft, and wherein said control device performs addition or subtraction to a flux strength of said main magnetic circuit in accordance with a flux strength of said control magnetic circuit and a distance from said target position of said rotation shaft.

7. The magnetic bearing according to claim 6, further comprising:

a position adjusting mechanism for enabling said radial stators to move back and forth radially within said housing.

8. The magnetic bearing according to claim 1, further comprising:

a position adjusting mechanism for enabling said radial stators to move back and forth radially within said housing.

* * * * *